(12) United States Patent
Kawaguchi

(10) Patent No.: US 10,274,062 B2
(45) Date of Patent: Apr. 30, 2019

(54) BALL SCREW

(71) Applicant: NTN Corporation, Osaka-shi (JP)

(72) Inventor: Hayato Kawaguchi, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 15/815,930

(22) Filed: Nov. 17, 2017

(65) Prior Publication Data

US 2018/0073616 A1 Mar. 15, 2018

Related U.S. Application Data

(63) Continuation of application No. PCT/JP2016/064803, filed on May 18, 2016.

(30) Foreign Application Priority Data

May 18, 2015 (JP) ................... 2015-101005

(51) Int. Cl.
| | | |
|---|---|---|
| *F16H 1/24* | (2006.01) | |
| *F16H 55/02* | (2006.01) | |
| *F16H 25/22* | (2006.01) | |
| *B22F 3/02* | (2006.01) | |
| *F16H 25/24* | (2006.01) | |
| *F16H 35/18* | (2006.01) | |

(52) U.S. Cl.
CPC ........... *F16H 25/2228* (2013.01); *B22F 3/02* (2013.01); *F16H 25/22* (2013.01); *F16H 25/2223* (2013.01); *F16H 25/24* (2013.01); *F16H 35/18* (2013.01)

(58) Field of Classification Search
CPC ..................................................... F16H 25/223
See application file for complete search history.

(56) References Cited

U.S. PATENT DOCUMENTS

| | | | | |
|---|---|---|---|---|
| 2005/0087031 A1* | 4/2005 | Ohkubo | ............. | F16H 25/2223 |
| | | | | 74/424.85 |
| 2009/0255752 A1* | 10/2009 | Asakura | ............. | F16H 25/2233 |
| | | | | 180/444 |
| 2012/0090419 A1* | 4/2012 | Kuo | .................... | F16H 25/2223 |
| | | | | 74/424.86 |

FOREIGN PATENT DOCUMENTS

| | | |
|---|---|---|
| JP | 2001-132811 | 5/2001 |
| JP | 2006-220215 | 8/2006 |
| JP | 2007-146915 | 6/2007 |
| JP | 2011-033080 | 2/2011 |
| JP | 2011-202708 | 10/2011 |

\* cited by examiner

*Primary Examiner* — Jake Cook
(74) *Attorney, Agent, or Firm* — Harness, Dickey & Pierce, P.L.C.

(57) ABSTRACT

A ball screw (1, 10) has a bridge member (5) formed with a linking groove (5*a*) on its inner surface that makes the rolling track a circulating track. The bridge member (5) is fit into a bridge window (6, 9) formed on a barrel of a nut (3, 8). The bridge window (6) has a pair of opposite linear parts or walls (6*a*, 6*a*). These linear parts or walls have openings, formed by the helical screw groove, leading to the linking groove of the bridge member. The linear parts or walls are arranged so that they cross the lead angle ($\theta$) of the nut screw groove at a right angle.

7 Claims, 7 Drawing Sheets

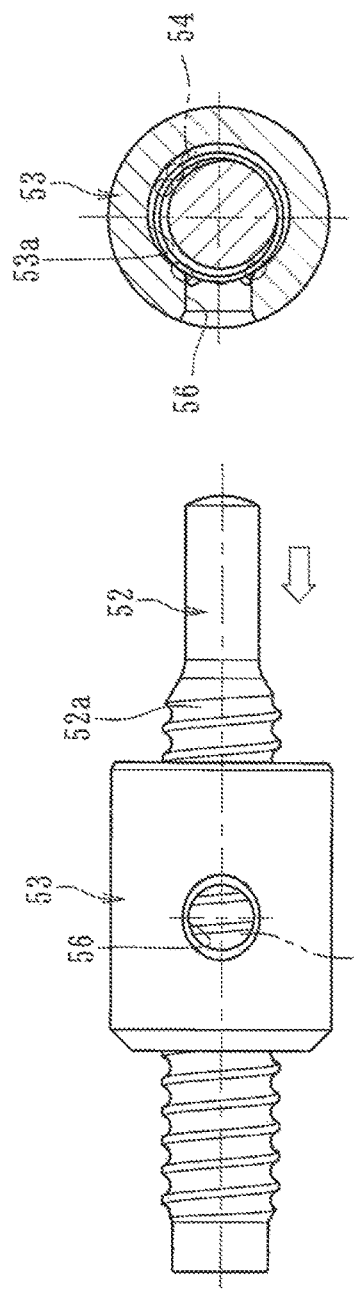
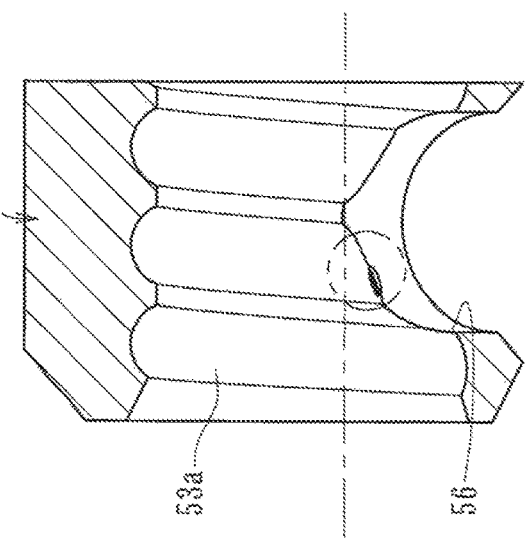
Fig. 8(a)
Fig. 8(b)
Fig. 8(c)

BALL SCREW

CROSS-REFERENCE TO RELATED APPLICATIONS

This application is a continuation of International Application No. PCT/JP2016/064803, filed May 18, 2016, which claims priority to Japanese Application No. 2015-101005, filed May 18, 2015. The disclosures of the above applications are incorporating herein by reference.

FIELD

The present disclosure relates to a ball screw used in various machine tools. Examples are electric discharging machines and tapping centers etc. or electric power steering and actuators etc. for automobiles. More particularly, it relates to ball screws that achieve long life by suppressing edge loads caused near the ball circulation parts.

BACKGROUND

Ball screws include a screw shaft, with a helical screw groove on its outer circumference, and a nut, formed with a helical screw groove on its inner circumference, to engage the screw shaft. A large number of balls are accommodated within a rolling track formed by the opposite screw grooves. A circulation mechanism enables the rolling track to be a circulating track. The ball screws are utilized as motion conversion mechanisms to linearly drive the screw shaft by rotating the nut.

In general, there are various types of ball circulating mechanisms used in the ball screws. One of which is a bridge-type. In the bridge-type ball screw, the bridge member for circulation of balls, is mounted on the nut. It has a linking track to enable the rolling tracks to be a circulation track. Its structure is relatively simple and compact.

One representative example of a bridge-type ball screw is shown in FIGS. 7(a) and (b). A barrel of a nut 53, of the bridge-type ball screw, is formed with a circular bridge window 56. The window 56 passes through the outer and inner circumference surfaces of the nut 53 while cutting out part of screw grooves 53a. A circular bridge member 55 is fit into the bridge window 56. The bridge member 55 is formed by a MIM (Metal Injection Molding) method. A linking groove 55a, for connecting mutually adjacent screw grooves 53a, is formed on the inner surface of the bridge member 55. This forms a rolling track for balls 54 consisting of the linking groove 55a and the screw groove 53a of substantially one lap. A large number of balls 54 are accommodated within a space between the screw groove 53a of the nut and a screw groove 52a of a screw shaft 52. The balls 54, rolling along the screw groove 53a, are guided to the linking groove 55a of the bridge member 55. The balls 54 ride over a screw thread of the screw shaft 52 and return to the screw groove 53a and continue to roll therealong again.

The linking groove 55a of the bridge member 55 has an S-shape. This smoothly connects two mutually adjacent screw grooves 53a of the nut 53. Accordingly, the linking groove 55a is joined to the screw grooves 53a so that edges 57 of the linking grooves 55a, of both edges of the bridge window 56, meet groove edges 58 of the screw groove 53a, as shown in FIG. 7(b). In addition, arms 59, each having a round rod-like shape, are projected from both sides of the bridge member 55. The arms 59 engage the nut screw grooves 53a via a predetermined radial gap. The arms 59 are able to axially position the bridge member 55 relative to the nut 53. The arms 59 prevent the bridge member 55 from radially slipping out from the bridge window 56.

In addition, the bridge member 55 has a recessed radially outer surface 60 and a pair of guide walls 61. The guide walls project radially outward from the recessed surface 60 at circumferentially opposite positions of the bridge member 55. The bridge member 55 is secured to the nut 53 by a caulked part 62. The caulked portion 62 is formed by plastically deforming the guide walls 61 using a caulking tool (not shown). This reduces the manufacturing cost while reducing the machining steps. Also, it provides a bridge-type ball screw that can exactly and easily set the axial position of the bridge member 55 relative to the nut 53. Thus, this improves its reliability (see JP2007-146915 A).

In such a bridge-type ball screw, processing time of the bridge window 56 can be reduced by making the shape of the bridge window 56 circular. However, the circular bridge window 56 has a problem in that it increases surface pressure of the screw groove 53a near the bridge member 55 since a portion of the screw groove 53a on which the balls 54 roll is loaded based on the contact angle when an axial load is applied to the screw shaft 52, as shown by an arrow in FIGS. 8(a) and (b). That is, the contact ellipse caused by rolling of balls 54 on the screw groove 53a is usually allowed by the screw groove 53a. However, since an edge part (part having an acute angle) of the bridge window 56 is present in the nut screw groove 53a leading into the bridge member linking groove 55a (see FIG. 7), it is believed that an excessive load, so-called "edge load", is created on the edge part of the bridge window 56 in the screw groove 53a by action of the contact ellipse onto the edge part when the balls 54 roll to the bridge member 55, as shown by an enlarged drawing of FIG. 8(c).

The inventor of the present disclosure has noticed the joining part, between the screw groove and the ball circulation part, such as the linking groove of the bridge member, forms a non-load area. It is an object of the present disclosure to provide a long life ball screw that reduces the edge load caused on the screw groove near the ball circulation part and thus prevent premature flaking of the screw groove due to excessive surface pressure.

SUMMARY

To achieve the object of the present disclosure, a ball screw is provided comprising a screw shaft, a cylindrical nut, a plurality of balls and a bridge member. The screw shaft includes a helical screw groove on its outer circumference. The cylindrical nut has a helical screw groove on its inner circumference. The cylindrical nut engages the screw shaft. The plurality of balls is accommodated within a rolling track formed by the opposite screw grooves. The bridge members each include a linking groove on its inner surface. The linking groove enables the rolling track to acts as a circulating track. The bridge members fit into bridge windows formed on a barrel of the nut. The bridge window has a pair of linear parts at its opposite sides. Each of the linear parts has an opening leading to the linking groove of the bridge member. Each of the linear parts is arranged so that it crosses the lead angle of the screw groove of the nut at a right angle.

The ball screw of the present disclosure includes bridge members. Each bridge member has a linking groove on its inner surface. The linking groove enables the rolling track to act as a circulating track. The bridge members fit into bridge windows formed on a barrel of the nut. The bridge window has a pair of linear parts at its opposite sides. Each of the linear parts has an opening leading to the linking groove of the bridge member. Each of the linear parts is arranged so that it crosses the lead angle of the screw groove of the nut at a right angle. This provides a long life ball screw that can relieve the edge of the joining parts between the screw grooves and the linking groove when the balls roll from the screw groove to the non-load area in the linking groove of the bridge member. This reduces the edge load causing excessive stress which is caused by action onto edge portions of a contact ellipse generated on the screw groove near the ball circulation part. Accordingly, this prevents premature flaking of the screw groove due to excessive surface pressure.

The bridge window has an oval shape formed by a pair of opposite linear parts. Another pair of opposite circular arc parts connects the linear parts.

The bridge window has a rectangular shape formed by a pair of opposite linear parts and another pair of opposite linear parts. Each of the opposite linear parts has openings leading to the linking groove arranged so that it crosses the lead angle of the screw groove of the nut at a right angle.

Each arm has a round rod-like shape. The arms project from both sides of the bridge member. Each arm engages the screw groove of the nut. This makes it possible to exactly set the axial position of the bridge member relative to the nut. Also, this prevents radial slipping-out of the bridge member from the bridge member.

The bridge member is formed of sintered metal formed by MIM. This makes it possible to exactly and easily form the bridge member with a desired shape and dimensions although it has a highly complicated shape.

A cylindrical nut includes a helical screw groove on its inner circumference. A screw shaft includes a helical screw groove on its outer circumference. The helical screw groove has the same lead angle as that of the nut screw groove. The screw shaft engages the nut. A plurality of balls is rollably accommodated within a rolling track formed by the opposite screw grooves. Ball circulation grooves, for making the plural screw grooves individually closed loop, are formed on a land part existing between axially adjacent screw grooves of the screw shaft. The ball circulation grooves are formed with an S-shape. The ball circulation grooves radially inwardly descend balls downstream of the screw grooves and then return the balls to an upstream side of the screw grooves while riding over a land part of the nut. The approach angle of the balls from the screw shaft screw grooves to the ball circulation grooves is arranged so that it crosses the lead angle of the screw grooves of the screw shaft at a right angle.

The ball circulation grooves, for making the plural screw grooves individual closed loops, are formed on a land part existing between axially adjacent screw grooves of the screw shaft. The ball circulation grooves have an S-shape. The ball circulation grooves radially inwardly descend balls downstream of the screw grooves and then return the balls to an upstream side of the screw grooves while riding over a land part of the nut. The approach angle of balls from the screw shaft screw grooves to the ball circulation grooves is arranged so that it crosses the lead angle of the screw grooves of the screw shaft at a right angle. This provides a long life ball screw that can relieve the edge of the joining parts between the screw grooves and the ball circulation grooves when the balls roll from the screw shaft screw groove to the ball circulation grooves. Also, it reduces the edge load causing excessive stress caused by action onto edge portions of a contact ellipse generated on the screw groove near the ball circulation part. Accordingly, this prevents premature flaking of the screw groove due to excessive surface pressure.

The discharge angle of balls from the ball circulation grooves to the screw grooves of the screw shaft is arranged so that it crosses the lead angle of the screw grooves of the screw shaft at a right angle. This relieves the edge of the joining parts between the screw grooves and the ball circulation grooves when the balls roll between the screw shaft screw grooves and the ball circulation grooves. This reduces the edge load causing excessive stress that is caused by action onto edge portions of a contact ellipse generated on the screw grooves near the ball circulation part. Accordingly, this prevents premature flaking of the screw grooves due to excessive surface pressure.

The bridge-type ball screw of the present disclosure includes a screw shaft, a cylindrical nut, a plurality of balls and bridge members. The screw shaft has a helical groove formed on its outer circumference. The cylindrical nut has a helical screw groove formed on its inner circumference. The nut engages the screw shaft. The plurality of balls is accommodated within a rolling track formed by the opposite screw grooves. The bridge members are each formed on their inner surface with a linking groove that makes the rolling track a circulating track. The bridge members fit into bridge windows formed on a barrel of the nut. The bridge window has a pair of linear parts at its opposite sides. Each of the linear parts has an opening leading to the linking groove of the bridge member. Each of the linear parts is arranged so that it crosses the lead angle of the screw groove of the nut at a right angle. This provides a long life ball screw that can relieve the edge of the joining parts between the screw grooves and the linking groove when the balls roll from the screw groove to the non-load area in the linking groove of the bridge member. Also, this reduces the edge load causing excessive stress that is caused by action onto edge portions of a contact ellipse generated on the screw groove near the ball circulation part. Accordingly, it prevents premature flaking of the screw groove due to excessive surface pressure.

The ball screw of the present disclosure comprises a cylindrical nut, a screw shaft, a plurality of balls and bridge members. The nut includes a helical screw groove formed on its inner circumference. The screw shaft has the same lead angle as that of the nut screw groove. The screw shaft engages the nut. The plurality of balls is rollably accommodated within a rolling track formed by the opposite screw grooves. Ball circulation grooves, making the plural screw grooves an individual closed loop, are formed on a land part existing between axially adjacent screw grooves of the screw shaft. The ball circulation grooves have an S-shape. The ball circulation grooves radially inwardly descend the balls downstream of the screw grooves and then return the balls to an upstream side of the screw grooves while riding over a land part of the nut. The approach angle of balls, from the screw grooves of the screw shaft to the ball circulation grooves, is arranged so that it crosses the lead angle of the screw grooves of the screw shaft at a right angle. This provides a long life ball screw that can relieve the edge of the joining parts between the screw grooves and the ball circulation grooves when the balls roll from the screw groove of the screw shaft to the ball circulation grooves. This reduces the edge load causing excessive stress that is caused by action onto edge portions of a contact ellipse generated on the screw groove near the ball circulation part. Accordingly, it prevents premature flaking of the screw groove due to excessive surface pressure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 8(a) is a front elevation view of a ball screw of FIG. 7.

FIG. 8(b) is a cross-section view of FIG. 8(a) through a bridge window part.

FIG. 8(c) is a partially enlarged view of FIG. 8(b).

DETAILED DESCRIPTION

Hereinafter, an embodiment of the present disclosure will be described in detail with reference to the drawings.

One mode for carrying out the present disclosure is a ball screw including a screw shaft, a cylindrical nut, a plurality of balls and bridge members. The screw shaft has a helical screw groove formed on its outer circumference. The cylindrical nut has a helical screw groove formed on its inner circumference. The nut engages the screw shaft. The plurality of balls is accommodated within a rolling track formed by the opposite screw grooves. The bridge members are each formed with a linking groove on its inner surface making the rolling track a circulating track. The bridge member is fit into a bridge window formed on a barrel of the nut. The bridge member is formed of sintered metal formed by MIM. The bridge window has a pair of linear parts at its opposite sides. Each of the linear parts has an opening leading to the linking groove of the bridge member. Each of the linear parts is arranged so that it crosses the lead angle of the screw groove of the nut at a right angle.

One preferable embodiment of the present disclosure will be hereinafter described with reference to the drawings.

Figure 1A:
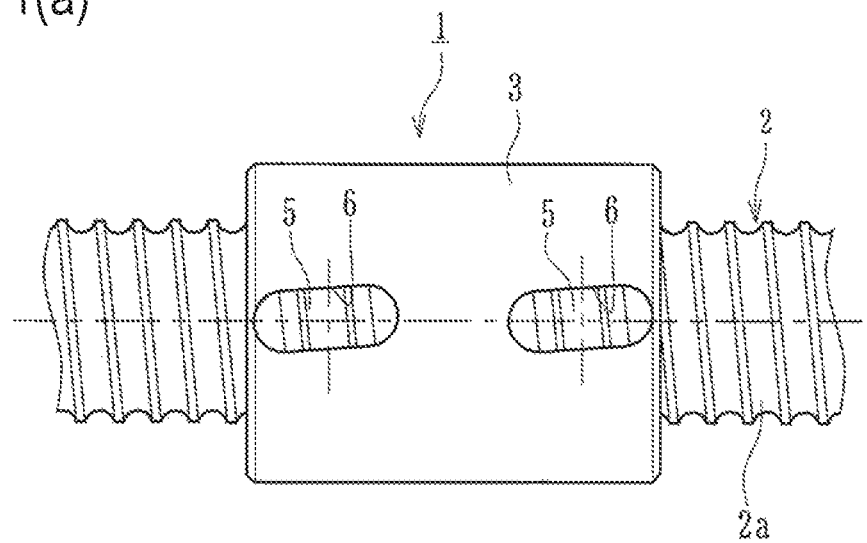
FIG. 1(a) is a plan view of a first embodiment of a ball screw.
Figure 1B:
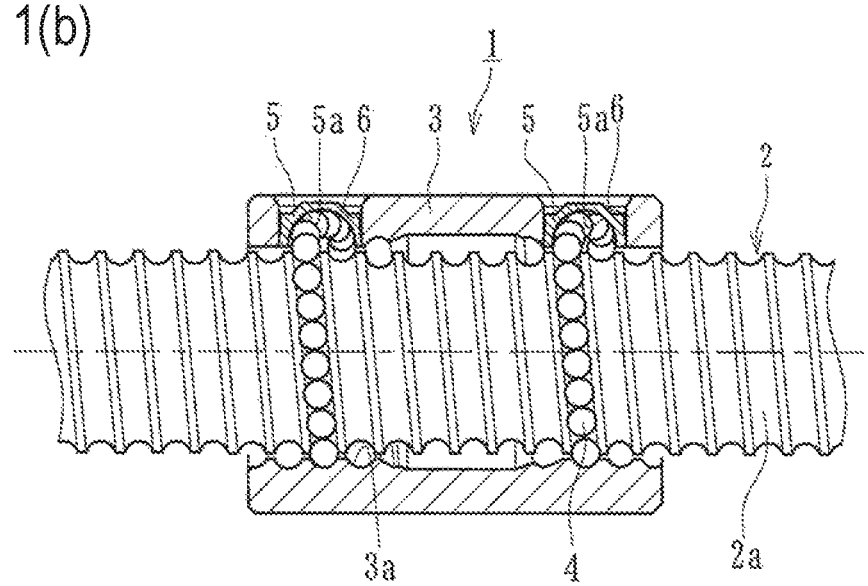
FIG. 1(b) is a longitudinal section view of FIG. 1(a).
Figure 2A:
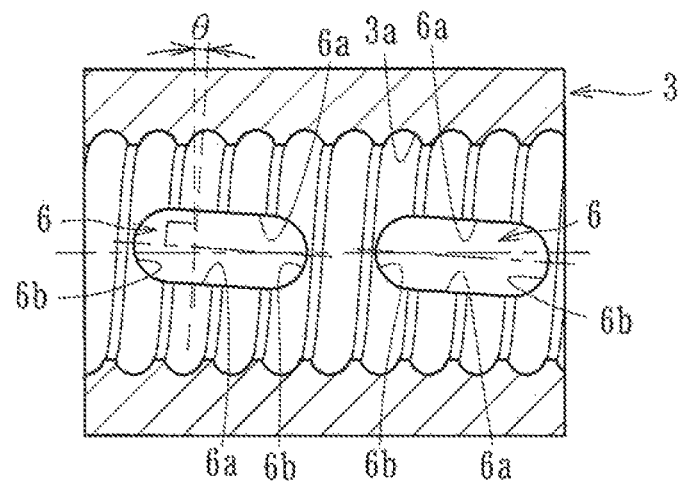
FIG. 2(a) is a longitudinal section view of a nut.
Figure 2B:
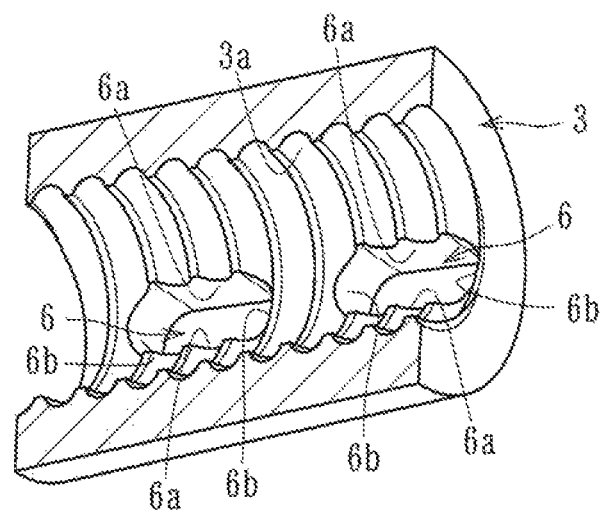
FIG. 2(b) is a perspective longitudinal section view of FIG. 2(a).
Figure 3:
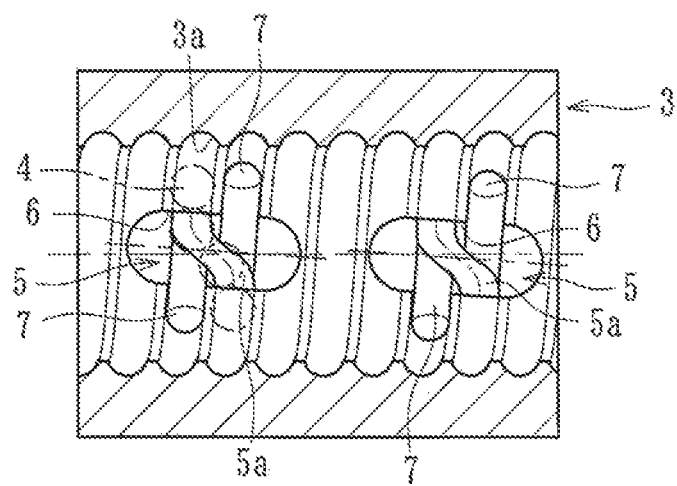
FIG. 3 is a longitudinal section view of a nut with a bridge member.
Figure 4A:
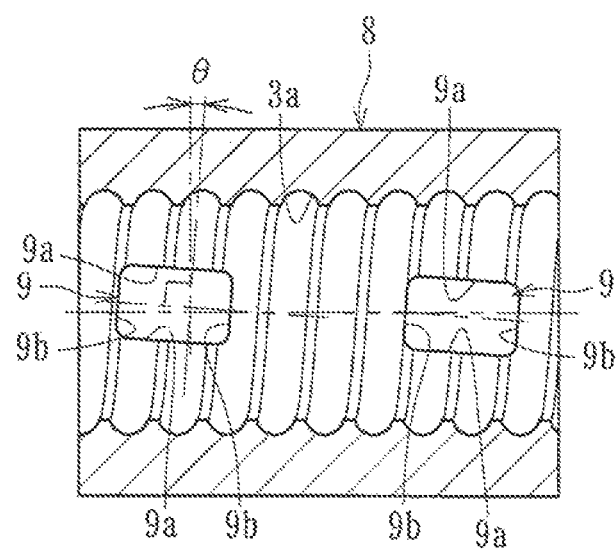
FIG. 4(a) is longitudinal section view of a modification of the nut of FIG. 2.
Figure 4B:
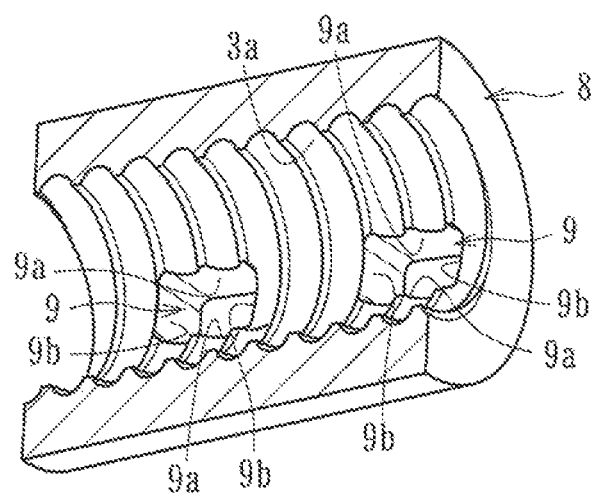
FIG. 4(b) is a perspective longitudinal section view of FIG. 4(a).

FIG. 1(a) is a plan view of a first embodiment of a ball screw. FIG. 1(b) is a longitudinal section view of FIG. 1(a). FIG. 2(a) is a longitudinal section view of a nut. FIG. 2(b) is a perspective longitudinal section view of FIG. 2(a). FIG. 3 is a longitudinal section view of a nut provided with a bridge member. FIG. 4(a) is a longitudinal section view of a modification of the nut of FIG. 2. FIG. 4(b) is a perspective longitudinal section view of FIG. 4(a).

A bridge-type ball screw 1, shown in FIGS. 1(a) and (b), is able to be used on mechanisms, such as a gear box etc., where a large load is applied. The ball screw 1 includes screw shaft 2, a nut 3, a number of balls 4 and bridge members 5. The screw shaft 2 has a helical screw groove 2a formed on its outer circumference. The nut 3 has a helical groove 3a d formed on its inner circumference. The nut 3 engages the screw shaft 2. The number of balls 4 is accommodated within a rolling track formed by the opposite screw grooves 2a, 3a. The bridge members 5, 5 circulate the balls 4.

The cross-sectional configuration of each of screw grooves 2a, 3a may be either one of circular-arc or Gothic-arc configuration. However, the Gothic-arc configuration is adopted in this embodiment. It has a large contacting angle with the ball 4 and sets a small axial gap. This enables a large rigidity against the axial load and thus suppresses the generation of vibration.

A barrel of the cylindrical nut 3 is formed with a bridge window 6 with an oval shape. The window 6 passes through outer and inner circumferences cutting off portion of the screw groove 3a. A bridge member 5 has an oval shape corresponding to that of the bridge window 6. The bridge member 5 is fit into the bridge window 6. A linking groove 5a, to connect mutually adjacent screw grooves 3a, is formed on the inner surface of the bridge member 5. This forms a rolling track for the balls 4 that includes the linking groove 5a and the screw groove 3a of substantially one lap. A large number of balls 4 are accommodated within a space between the inner and outer screw grooves 2a, 3a. The balls 4 are guided to the linking groove 5a of the bridge member 5. The balls 4 ride over a screw thread of the screw shaft 2 and return to the screw groove 3a and again roll along the screw grooves 2a, 3a.

The depth of the bridge member linking groove 5a is set such that the balls 4 can ride over the screw groove screw shaft screw thread within the linking groove 5a. In addition, as shown in FIG. 3, the bridge member 5 linking groove 5a is formed with an S-shape curve. Thus, the linking groove 5a smoothly connects two mutually adjacent screw grooves 3a of the nut 3. In addition, arms 7, each with a round rod-like shape, project from both sides of the bridge member 5. The arms 7 engage the nut screw grooves 3a, via a small radial gap. The arms 7 can axially position the bridge member 5 relative to the nut 3. The arms 7 prevent the bridge member 5 from radially slipping out from the bridge window 6. As shown in FIG. 1(b), each bridge member 5 is rigidly secured to the nut 3 by caulking. The bridge member 5 is plastically deformed onto a radially outer opening shoulder of the bridge window 6.

In the present embodiment, the bridge member 5 is formed from sintered alloy by an injection molding machine that molds plastically prepared metallic powder. In this injection molding, metallic powder and a binder, comprising plastics and wax, are firstly mixed and kneaded by a mixing and kneading machine. This forms pellets from the mixed and kneaded material. The pellets are fed into a hopper of the injection molding machine. The material is then pushed into dies under a heated and melted state. It is finally formed into the bridge member by a so-called MIM (Metal Injection Molding) process. The MIM method can easily mold sintered alloy material into articles with desirable accurate configurations and dimensions even though the article requires high manufacturing technology and has a hard to form configuration.

One example of metallic powder for the sintering alloy able to be carburized is SCM415. It is comprised of C of 0.13 wt %, Ni of 0.21 wt %, Cr of 1.1 wt %, Cu of 0.04 wt %, Mn of 0.76 wt %, Mo of 0.19 wt %, Si of 0.20 wt % and remainder Fe etc. The bridge member 5 is formed by controlling the temperature of cementation quenching and cementation tempering. There are materials other than that mentioned above. Such a material superior in the workability and corrosion resistance comprises Ni of 3.0~10.0 wt % (e.g. FEN8 of Japanese powder metallurgy industrial standard) or precipitation hardening system stainless steel SUS630 comprising C of 0.07 wt %, Cr of 17 wt %, Ni of 4 wt %, Cu of 4 wt % and remainder Fe etc. This SUS630 is able to suitably increase the surface hardness to 20~33 HRC by solid-solution heat treatment to secure the toughness and high hardness.

When forming the bridge member 5 using cementation material such as SCM415 etc., the bridge member 5 is hardened to have a surface hardness of 30~40 HRC. This occurs by controlling the temperature of the cementation quenching or the cementation hardening. In addition, when the bridge member 5 is formed using precipitation hardening system stainless steel such as SUS630 etc., it is set so that the bridge member 5 has a surface hardness larger than 30 HRC by solid-solution heat treatment. SUS630 has characteristics where its alloy elements can be easily solid-melted by rapid cooling after heating to a predetermined temperature.

As shown in FIGS. 2(a) and (b), the bridge window 6 formed in the nut 3 includes a pair of opposite linear parts 6a, 6a. Another pair of opposite circular arc parts 6b, 6b connecting the linear parts 6a, 6a. This forms an oval shape by end-mill process. Each of the linear parts 6a, 6a has an opening leading to the bridge member 5 linking groove 5a (FIG. 3). Each linear part or wall is arranged so that it crosses the lead angle θ of the nut screw groove 3a at a right angle. This relieves the edge of the joining parts between the screw grooves 3a and the linking groove (circulation part) 5a when the balls 4 roll from the screw groove 3a to the non-load area (linking groove 5a) of the bridge member 5. That is, it is possible to provide a long life ball screw 1 that can reduce the edge load causing excessive stress that is caused by action onto edge portions of a contact ellipse generated on the screw groove 3a near the ball circulation part. Accordingly, this prevents premature flaking of the screw groove due to excessive surface pressure.

FIGS. 4(a) and (b) show a modification of the previously described nut 3. This modified nut 8 has a bridge window 9 with a rectangular shape formed by cutting off parts of the screw grooves 3a passing through the inner and outer circumference of the nut 8. The bridge window 9 has a pair of opposite linear parts 9a, 9a and another pair of opposite linear parts 9b, 9b. Each of the opposite linear parts 9a, 9a has openings leading to the linking groove of the bridge member (not shown in FIG. 4). Each of the opposite linear parts 9a, 9a is arranged so that it crosses the lead angle θ of the screw groove 3a of the nut 8 at a right angle. Similar to the previously described embodiment, this reduces the edge load caused near the ball circulation part of the bridge member. This prevents premature flaking of the screw groove due to excessive surface pressure. Thus, it extends the life of the ball screw.

Figure 5A:
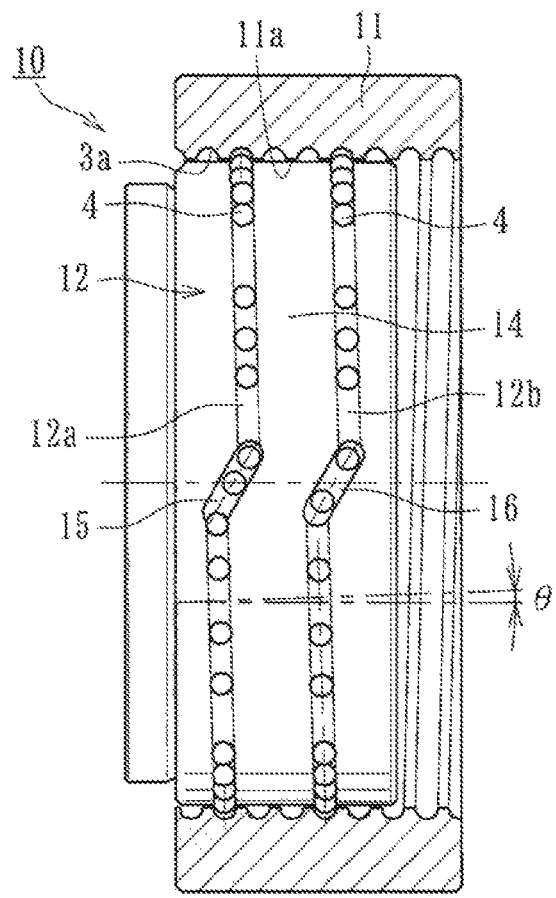
FIG. 5(a) is a longitudinal section view of a ball screw of a second embodiment.
Figure 5B:
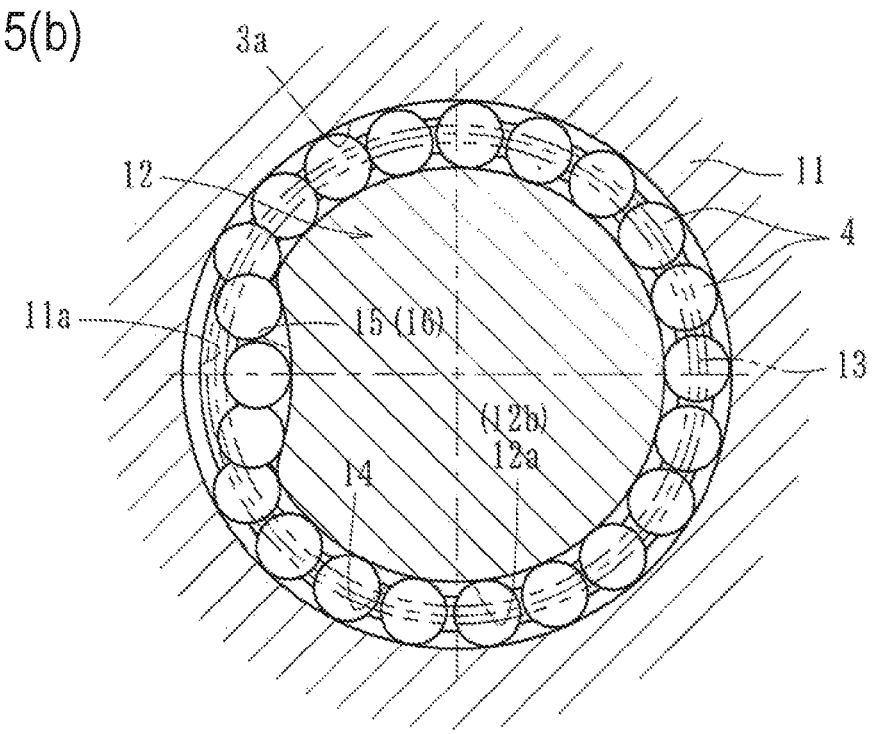
FIG. 5(b) is a cross-section view of a ball circulation part of FIG. 5(a).
Figure 6:
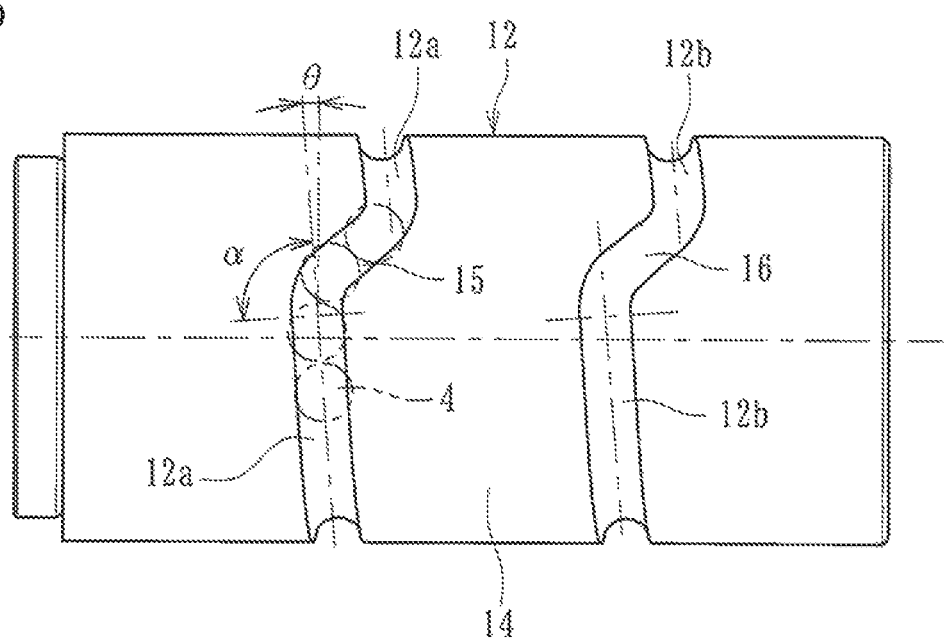
FIG. 6 is a front elevation view of a screw shaft of FIG. 5.
Figure 7A:
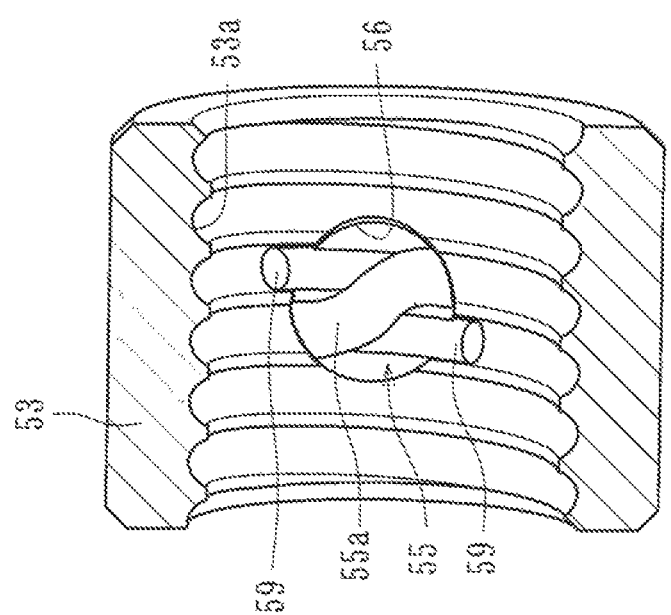
FIG. 7(a) is a perspective longitudinal section view of a prior art ball screw nut.
Figure 7B:
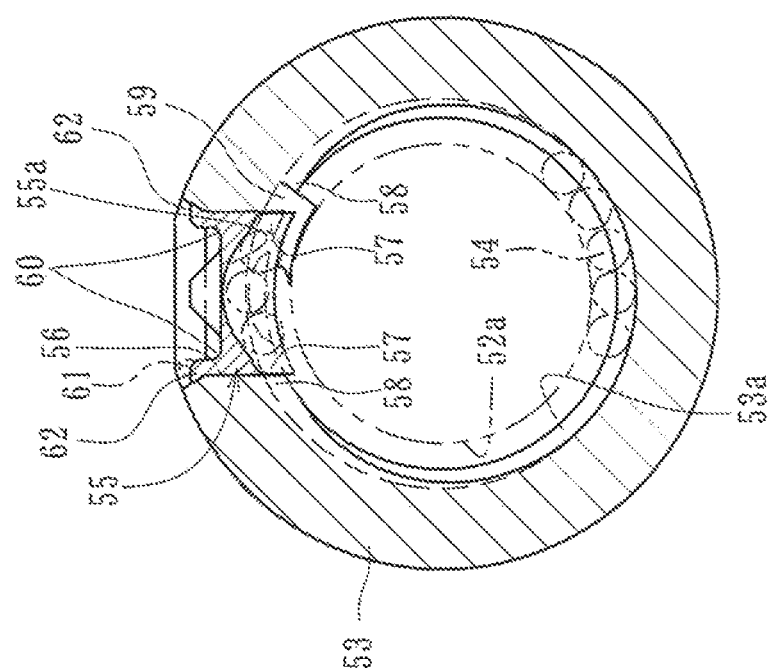
FIG. 7(b) is a cross-section view of FIG. 7(a).

FIG. 5(a) is a longitudinal section view of a ball screw of a second embodiment. FIG. 5(b) is a cross-section view of a ball circulation part of FIG. 5(a). FIG. 6 is a front elevation view of a screw shaft of FIG. 5. This ball screw 10 is basically different from the ball screw 1 (FIG. 1) only in the structure of the ball circulation part. Accordingly, the same reference numerals are used to identify parts that have the same or similar functions as those in the ball screw 1.

As shown in FIGS. 5(a) and (b), the ball screw 10 includes a cylindrical nut 11, a screw shaft 12 inserted into the nut 11, a large number of balls 4 accommodated in a space between the screw shaft 12 and the nut 11, and a cage ring 13 to hold the balls 4 equidistantly along the circumference. The cage ring 13 is mounted so that it cannot substantially move axially but is rotatable relative to the screw shaft 12.

The nut 11 is formed of case-hardened steel such as SCM415 or SCM420. It includes the helical screw groove 3a on its inner circumference. The screw shaft 12 is formed of medium carbon steel such as S55C or case-hardened steel such as SCM415. The screw shaft 12 includes a plurality of discontinuous screw grooves 12a, 12b (herein two-strip screw grooves) on its outer circumference at an axially medium region. Both the screw groove 3a of the nut 11 and the screw grooves 12a, 12b of the screw shaft 12 have the same lead angle θ with respect to each other. The screw grooves 12a, 12b have a Gothic-arc configuration. The configuration is a combination of two circular arcs with a slightly larger radius of curvature in the cross-section than that of the radius of the ball 4. The screw grooves 12a, 12b may have a circular arc configuration. Here, the arc would have a slightly larger radius than that of the balls 4 and angularly contact the balls 4 other than the Gothic arc configuration.

According to the present embodiment, the plurality of screw grooves 12a, 12b are formed as closed loops. Thus, the balls 4 accommodated in the plurality of screw grooves 12a, 12b can independently circulate. That is, ball circulation grooves 15, 16, which make the plural screw grooves 12a, 12b individual closed loops, are formed on a land part 14 existing between axially adjacent screw grooves 12a, 12b of the screw shaft 12.

The ball circulation grooves 15, 16 are intended to separately connect an upstream side and a downstream side of the screw grooves 12a, 12b. Thus, they are formed with an S-shape to radially inwardly descend the balls 4 downstream of the screw grooves 12a, 12b and then return the balls 4 to an upstream side of the screw grooves 12a, 12b while riding over a land part 11a of the nut 11. Accordingly, the depth of the ball circulation grooves 15, 16 is set so that the balls 4 can ride over the land part 11a of the nut screw groove 3a.

The screw grooves 12a, 12b can be turn processed using end mill tools (not shown) by synchronously rotating the screw shaft 12 in a predetermined direction. The end mill tools are supported movably in both radial and axial directions. Their position is determined by NC control. The turning process of the screw grooves 12a, 12b is carried out by a so-called "point cutting". Here, the end mills are moved several times by the effective length of the screw grooves 12a, 12b to repeating locus of the end mills.

Also in the present embodiment, a hardened layer of 55~62 HRC is formed on the screw grooves 12a, 12b by heat treatment after forming the screw grooves 12a, 12b by point cutting. The heat treatment may be cementation quenching or high frequency induction. However, high frequency induction is preferable since it suppresses the generation of a grain boundary oxidation layer. Also, high frequency induction enables partial heating and thus it is relatively easy to set the depth of the hardened layer.

In addition, a finishing process (not shown) may be performed on the screw grooves 12a, 12b by shot peening to remove scale or a grain boundary oxidation layer adhered by heat treatment. This improves the durability of the ball screw. The shot peening is performed under conditions with 20~100 μm diameter steel beads, about 90 seconds of injection time, 1~3 kg/cm² of injection pressure, and about 140 mm of distance between an injection nozzle and the work piece.

As shown in FIG. 6, the approach (or discharge) angle of balls 4 from (or to) the screw grooves 12a, 12b of the screw shaft 12 to (or from) the ball circulation grooves 15, 16 is arranged so that it crosses the lead angle θ of the screw grooves 12a, 12b of the screw shaft 12 at a right angle. That is, the crossing angle α between the approach angle of balls 4, where the non-load area of the ball circulation grooves 15, 16 starts or the discharge angle of the balls 4 where the load area (screw grooves 12a, 12b) starts from the non-load area of the ball circulation grooves 15, 16, and the lead of the screw grooves 12a, 12b is set at a right angle. This provides a long life ball screw 10 that can relieve the edge of the joining parts between the screw grooves 12a, 12b and the ball circulation grooves 15, 16 when the balls 4 roll from the screw grooves 12a, 12b of the screw shaft 12 to the ball circulation grooves 15, 16. Thus, this reduces the edge load causing excessive stress that is caused by action onto edge portions of a contact ellipse generated on the screw grooves near the ball circulation part. Accordingly, this prevents premature flaking of the screw grooves due to excessive surface pressure.

The ball screw of the present disclosure can be applied to various ball screws used for electric actuators of automobiles etc.

The present disclosure has been described with reference to the preferred embodiment. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A ball screw comprising:
    a screw shaft formed with a helical screw groove on an outer circumference of the screw shaft;
    a cylindrical nut formed with a helical screw groove on an inner circumference of the nut and the nut engages the screw shaft;
    a plurality of balls accommodated within a rolling track formed by the opposite screw grooves;
    bridge members are each formed on its inner surface with a linking groove enabling the rolling track to act as a circulating track, each bridge member adapted to fit in a bridge window formed on a barrel of the nut;
    the bridge window has a pair of linear parts at its opposite sides,
    each of the linear parts has an opening leading to the linking groove of the bridge member; and
    each of the linear parts is arranged so that it crosses a lead angle (θ) of the screw groove of the nut at a right angle.

2. The ball screw of claim 1, wherein the bridge window has an oval shape with a pair of opposite linear parts and another pair of opposite circular arc parts connecting the linear parts.

3. The ball screw of claim 1, wherein the bridge window has a rectangular shape with a pair of first opposite linear parts and a pair of second opposite linear parts, each of the first opposite linear parts having openings leading to the linking groove arranged so that it crosses the lead angle (θ) of the nut screw groove at a right angle.

4. The ball screw of claim 1, wherein arms, each having a round rod-like shape, project from both sides of the bridge member, and each arm engages the nut screw groove.

5. The ball screw of claim 1, wherein the bridge member is formed of sintered metal formed by MIM (Metal Injection Molding).

6. A ball screw comprising:
    a cylindrical nut formed with a helical screw groove on an inner circumference;
    a screw shaft formed with a helical screw groove on an outer circumference having a same lead angle (θ) as that of the nut screw groove and the screw shaft engages the nut;
    a plurality of balls rollably accommodated within a rolling track formed by the opposite screw grooves;
    ball circulation grooves, making the plural screw grooves individual closed loops, formed on a land part existing between axially adjacent screw grooves of the screw shaft, the ball circulation grooves having an S-shape for radially inwardly descending balls downstream of the screw grooves and then returning the balls to an upstream side of the screw grooves while riding over a land part of the nut;
    the approach angle of the balls from the screw shaft screw grooves to the ball circulation grooves is arranged so that it crosses the lead angle (θ) of the screw shaft screw grooves at a right angle.

7. The ball screw of claim 6, wherein the discharge angle of the balls from the ball circulation grooves to the screw shaft screw grooves is arranged so that it crosses the lead angle (θ) of the screw shaft screw grooves at a right angle.

* * * * *